Figure 3:
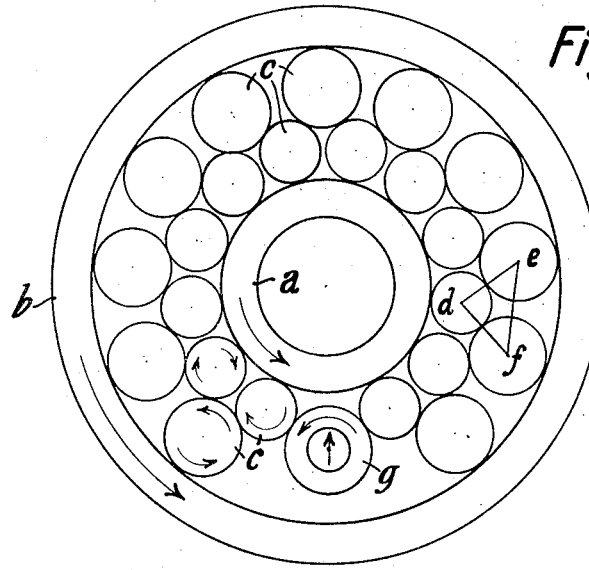

Dec. 3, 1929.  W. ZADOW  1,737,695
FRICTION ROLLER TRANSMISSION GEAR
Filed April 14, 1927   2 Sheets-Sheet 1
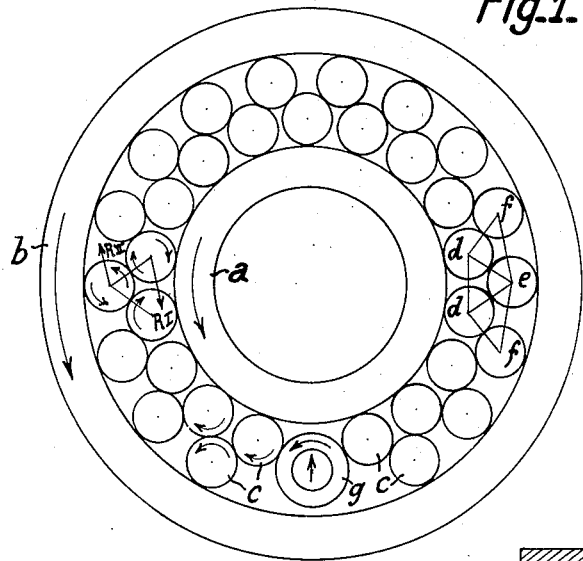
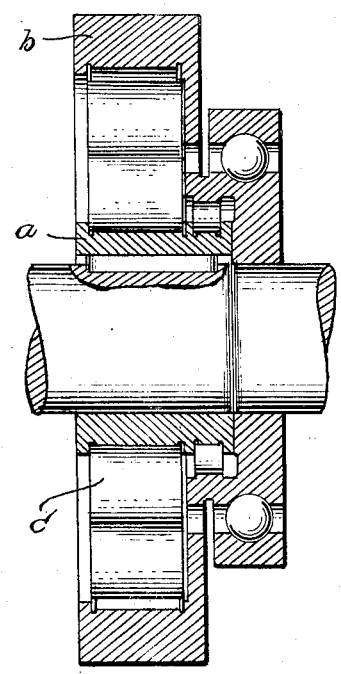
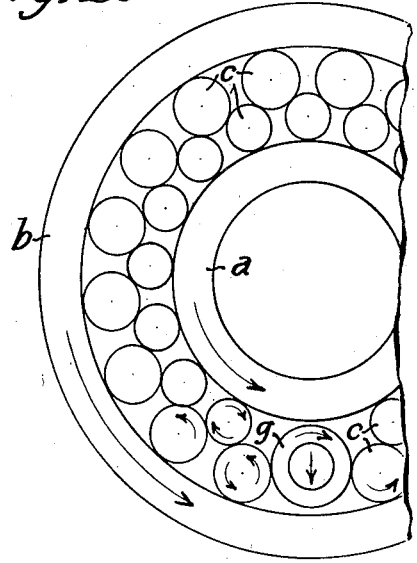
W. Zadow
inventor Patented Dec. 3, 1929

1,737,695

UNITED STATES PATENT OFFICE

WALDEMAR ZADOW, OF BERLIN, GERMANY

FRICTION-ROLLER TRANSMISSION GEAR

Application filed April 14, 1927, Serial No. 183,858, and in Germany April 20, 1926.

This invention relates to friction roller transmission gears and has for its object to provide a friction roller gear for converting a given rotary motion into a quicker or slower rotary motion about the same axis, use being made of the ordinary rollers such as are supplied by the makers of ball and roller bearings. Friction roller gears are known, which also employ the balls and rollers supplied by the makers of ball and roller bearings, but with such gears it is not possible to transmit considerable powers, as these gears do not present sufficient friction surface and the requisite bearing pressure of the friction rollers is produced in a faulty manner which has not proved satisfactory in practice. In addition to this, with gears of this kind it is only possible to produce a low gearing ratio.

As compared with these known types of transmission gear that according to the present invention has the advantage, that it allows of the employment of a large number of friction rollers, whereby the transmitting power is proportionally increased and, that a great bearing pressure is produced in a very simple and absolutely reliable manner by the employment of a small initial force, whereby the power transmission is also increased. A further advantage of the new arrangement is that, while using rollers of the ordinary dimensions as supplied by the makers of ball and roller bearings, it is possible to obtain a higher transmission ratio, as shall now be described.

In the accompanying drawing the gear according to the present invention is shown diagrammatically in Figures 1 to 4.

Fig. 5 shows the application of the device to driving and driven shafts.

The gear consists substantially of an inner race $a$, the outer surface of which acts as the running surface, and the outer race $b$, the inner surface of which acts as the running surface. According to the invention, as shown in Figures 1 to 4, two or more rows of friction rollers $c$ are arranged between the races $a$ and $b$ in such a manner that the lines connecting the centres of two rollers of the inner row and one roller of the outer row form an isosceles triangle $d\ e\ f$ the rollers being in contact on the equal sides of the triangle, and that the rollers of the inner row make contact with the inner race and the rollers of the outer row with the outer race. The rollers $c$ are of similar dimensions and quality as those ordinarily used for roller bearings. Their length may be many times their diameter, according to the stresses to which they are to be subjected. For pressing the friction rollers $c$ of the middle row a pressure roller $g$ is provided which is capable of being moved by a suitable mechanism not shown in the drawing, either towards the centre of the gear or away from the centre thereof, until the desired bearing pressure is obtained.

Figure 4:
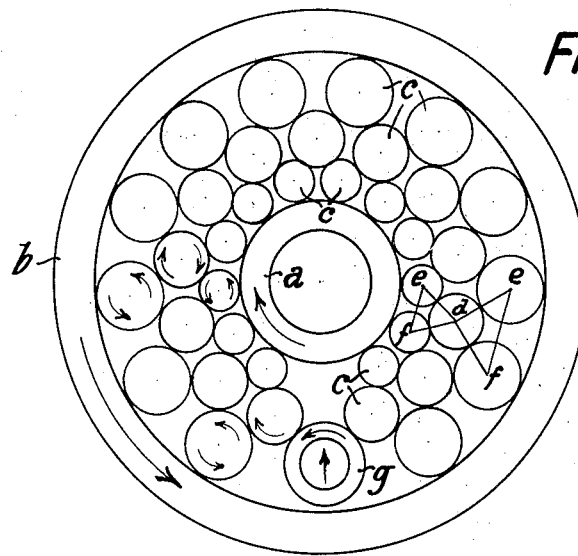

The gear can be used in the following manner. If, after the suitable pressure has been applied to the pressure roller $g$, the axis of the pressure roller $g$ is held in position and the inner race $a$ is turned, the friction rollers $c$, when two rows of friction rollers $c$ are provided will transmit the rotary motion in the same direction of rotation to the outer race $b$, the speed of rotation of the race $b$ being slower than that of the race $a$ in the same proportion as the diameter of the race $b$ is greater than that of the race $a$. When the rotary motion is to be geared up, the initial rotary motion is transmitted to the outer race $b$. When an opposite direction of rotation is required, an uneven number of rows of friction rollers is used, i. e. 3, 5 and so on, as shown in Figure 4. When a greater gearing ratio is required more than two rows of friction rollers $c$ are also used. According to the invention it is possible to use friction rollers $c$ of greater diameter in each successive layer towards the outside, as this has no effect on the smooth rolling motion of the rollers. If the axis of rotation of the pressure roller $g$ be revolved about the main axis of the gear, it is possible to obtain with the gear all the kinds of motion obtainable with a sun and planet motion.

It has been found that the gear according to the invention has the following advantages:

(1) The arrangement of the friction rollers $c$ enables a large number of friction rollers to be used. Since each single friction roller only transmits a relatively small power, it is only made possible by the provision of the great number of friction rollers $c$ according to the invention to transmit high powers.

(2) The arrangement of the friction rollers $c$ in combination with the provision of the pressure roller $g$ enables all the friction rollers to be held automatically in position without the provision of any special supporting means.

(3) The reaction force exerted by the rotating and power transmitting friction rollers $c$ on the stationary axis of the pressure roller $g$ is only small, as the reaction forces of the separate rows of friction rollers are oppositely directed (Fig. 1, RI and RII) and thereby partly balance each other in proportion to their distance from the centre of the gear.

(4) The pressure roller $g$ is so arranged that it acts in the manner of a toggle joint on the friction rollers $c$ in contact with it. Hence only a small transverse pressure on the axis of the pressure roller $g$ is required for obtaining a considerable bearing pressure.

(5) Through the arrangement of the friction rollers $c$ according to the present invention the pressure exerted on the pressure roller $g$ will be propagated evenly and with the same force to all the friction rollers $c$, each roller being forced like a wedge between the next friction roller in contact with it and the race $a$ and $b$, a relatively small initial pressure resulting in a considerable pressure of the friction rollers $c$ against one another and against the running surfaces of the races $a$ and $b$.

(6) The high degree of pressure exerted by the friction rollers $c$ and obtained with only a relatively small initial pressure also enables the power transmission to be increased.

(7) The arrangement of the pressure roller $g$ makes the load on the journal of the pressure roller $g$ small, as the reaction pressures of the pressure rollers $c$ contacting with it on either side partially balance each other, viz to the extent of their angular deviation from a straight line.

(8) The high pressure exerted by the friction rollers $c$ which can be obtained in accordance with the present invention by a small initial force, makes it possible to use long friction rollers, these still further increasing the force that can be transmitted and increasing the life of the gear.

(9) The gear according to the present invention is particularly simple in construction.

What I claim is:

1. Friction roller transmission gear with coaxial driving and driven shafts, comprising in combination an outer race ring, an inner race ring, a plurality of rows of friction rollers between the said outer and inner race rings, the rollers being so arranged that the rollers of the row running on the inner race ring are not in contact with one another and that the rollers of one of the outer rows of rollers each make contact with two rollers of the inner row lying next to it and movable means engaging certain adjacent friction rollers of one row of rollers operable to vary the frictional engagement between the rollers and the rings and between adjacent rollers, as and for the purpose set forth.

2. Friction roller transmission gear as claimed in claim 1 and having the inner row of rollers of smaller and the outer row of rollers of larger diameter, as and for the purpose set forth.

3. Friction roller transmission gear as claimed in claim 1, said friction varying means comprising a pressure roller mounted between two adjacent friction rollers of one row of rollers and capable of being pressed against the said two rollers, as and for the purpose set forth.

4. Friction roller transmission gear with coaxial driving and driven shafts, comprising in combination an outer race ring, an inner race ring, a plurality of rows of friction rollers between the said outer and inner race rings, the rollers being so arranged that the lines connecting the centres of two rollers of one row and one roller of the next adjacent row form an isosceles triangle, the rollers on the equal sides of the triangle being in contact with one another and the rollers of the inner row contacting with the inner race ring and the rollers of the outer row with the outer race ring, and movable means engaging certain adjacent friction rollers of one row of rollers operable to vary the frictional engagement between the rollers and the rings and between adjacent rollers as and for the purpose set forth.

In testimony whereof I have signed my name to this specification.

WALDEMAR ZADOW.